(12) United States Patent
Akirav et al.

(10) Patent No.: US 10,007,672 B2
(45) Date of Patent: *Jun. 26, 2018

(54) GLOBAL DIGESTS CACHING IN A DATA DEDUPLICATION SYSTEM

(71) Applicant: INTERNATIONAL BUSINESS MACHINES CORPORATION, Armonk, NY (US)

(72) Inventors: Shay H. Akirav, Petach-Tikva (IL); Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/826,945

(22) Filed: Nov. 30, 2017

(65) Prior Publication Data
US 2018/0089220 A1    Mar. 29, 2018

Related U.S. Application Data

(63) Continuation of application No. 13/941,711, filed on Jul. 15, 2013, now Pat. No. 9,892,127.

(51) Int. Cl.
*G06F 12/08* (2016.01)
*G06F 3/06* (2006.01)
(Continued)

(52) U.S. Cl.
CPC ........ *G06F 17/30159* (2013.01); *G06F 3/067* (2013.01); *G06F 3/0619* (2013.01);
(Continued)

(58) Field of Classification Search
CPC ........... G06F 17/30159; G06F 17/3033; G06F 17/30097; G06F 17/30156;
(Continued)

(56) References Cited

U.S. PATENT DOCUMENTS 5,990,810 A    11/1999  Williams
6,591,250 B1    7/2003  Johnson et al.
(Continued)

FOREIGN PATENT DOCUMENTS

WO    2012092348 A2    7/2012
WO    2012158654 A2    11/2012

OTHER PUBLICATIONS

Anonymous, "Framework for Stream De-duplication using Biased Reservoir-Sampling," http://priorartdatabase.com/IPCOM/000216344, Mar. 31, 2012.
(Continued)

*Primary Examiner* — Mano Padmanabhan
*Assistant Examiner* — William E. Baughman
(74) *Attorney, Agent, or Firm* — Griffiths & Seaton PLLC

(57) ABSTRACT

For utilizing a global digests cache in deduplication processing in a data deduplication system using a processor device in a computing environment, input data is partitioned into data chunks and digest values are calculated for each of the data chunks. The positions of similar repository data are found in a repository of data for each of the data chunks. The input digests of the input data are matched with the repository digests contained in the global digests cache for locating data matches. The positions of the similar repository data are used to locate and linearly load into the global digests cache, digests and digest block boundaries of the similar repository data in a sequence corresponding to a placement order of calculated values of the digests of the similar repository data.

24 Claims, 8 Drawing Sheets

(51) Int. Cl.
*G06F 17/30* (2006.01)
*G06F 12/0875* (2016.01)
*G06F 12/0846* (2016.01)

(52) U.S. Cl.
CPC ........ *G06F 3/0641* (2013.01); *G06F 12/0848* (2013.01); *G06F 12/0875* (2013.01)

(58) Field of Classification Search
CPC ........... G06F 17/30312; G06F 11/1453; G06F 11/1435; G06F 3/0641; G06F 3/0608; G06F 3/061; G06F 3/0604; G06F 12/0864; G06F 12/12; G06F 12/122; G06F 12/1027
See application file for complete search history.

(56) References Cited

U.S. PATENT DOCUMENTS

| | | | |
|---|---|---|---|
| 6,810,398 | B2 | 10/2004 | Moulton |
| 7,523,098 | B2 | 4/2009 | Hirsch et al. |
| 7,627,609 | B1 | 12/2009 | Ozekinci et al. |
| 7,694,191 | B1 | 4/2010 | Bono et al. |
| 7,814,070 | B1 | 10/2010 | Kaminski, Jr. |
| 7,908,250 | B2 | 3/2011 | Terazono et al. |
| 8,108,353 | B2 | 1/2012 | Balachandran et al. |
| 8,200,923 | B1 | 6/2012 | Healy et al. |
| 8,285,957 | B1 | 10/2012 | Nag et al. |
| 8,412,848 | B2 | 4/2013 | Therrien et al. |
| 8,639,669 | B1 | 1/2014 | Douglis et al. |
| 8,914,338 | B1 | 12/2014 | Wallace et al. |
| 8,918,390 | B1 | 12/2014 | Shilane et al. |
| 2006/0059173 | A1 | 3/2006 | Hirsch et al. |
| 2007/0230791 | A1 | 10/2007 | Chellapilla et al. |
| 2008/0013830 | A1 | 1/2008 | Patterson et al. |
| 2008/0301134 | A1 | 12/2008 | Miller et al. |
| 2009/0307251 | A1 | 12/2009 | Heller et al. |
| 2010/0088277 | A1 | 4/2010 | Rao et al. |
| 2010/0088349 | A1 | 4/2010 | Parab |
| 2010/0198797 | A1 | 8/2010 | Wideman |
| 2010/0205163 | A1 | 8/2010 | Eshghi et al. |
| 2011/0016095 | A1 | 1/2011 | Anglin et al. |
| 2011/0238635 | A1 | 9/2011 | Leppard |
| 2011/0246741 | A1 | 10/2011 | Raymond et al. |
| 2011/0276781 | A1 | 11/2011 | Sengupta et al. |
| 2012/0023070 | A1 | 1/2012 | Prahlad et al. |
| 2012/0023112 | A1 | 1/2012 | Levow et al. |
| 2012/0143835 | A1 | 6/2012 | Aronovich et al. |
| 2012/0166448 | A1 | 6/2012 | Li et al. |
| 2012/0226697 | A1 | 9/2012 | Chang et al. |
| 2012/0233135 | A1 | 9/2012 | Tofano |
| 2012/0239625 | A1 | 9/2012 | Aronovich et al. |
| 2012/0259825 | A1 | 10/2012 | Tashiro et al. |
| 2013/0018854 | A1 | 1/2013 | Condict |
| 2014/0115244 | A1 | 4/2014 | Maybee et al. |

OTHER PUBLICATIONS

Bhagwat et al., "Extreme Binning: Scalable, Parallel De-duplication for Chunk-based File Backup," Proceedings of the 17th IEEE/ACM International Symposium on Modeling, Analysis and Simulation of Computer and Telecommunication Systems (MASCOTS'2009), London, UK, Sep. 2009.
Zhu et al., "Avoiding the disk bottleneck in the Data Domain deduplication file system," In Proceedings of the 6th USENIX Conference on File and Storage Technologies (FAST) (San Jose, CA, USA), USENIX Association, pp. 269-282, Feb. 2008.
Lillibridge et al., "Sparse Indexing: Large scale, inline deduplication using sampling and locality," Proceedings of the Eighth USENIX Conference on File and Storage Technologies (FAST), pp. 111-123, Feb. 2009.
Romanski et al., "Anchor-driven subchunk deduplication," Proceedings of the 4th Annual International Conference on Systems and Storage (SYSTOR '11), ACM, New York, NY, USA, Article 16, 13 pages.
Muthitacharoen et al., "A low-bandwidth network file system," Proceedings of the 18th ACM Symposium on Operating Systems Principles (SOSP) (Banff, Alberta, Canada), ACM Press, pp. 174-187, Oct. 2001.
Cai et al., "Research on Chunking Algorithms of Data De-Duplication," American Journal of Engineering and Technology Research, vol. 11, No. 9, 2011.

GLOBAL DIGESTS CACHING IN A DATA DEDUPLICATION SYSTEM

CROSS REFERENCE TO RELATED APPLICATIONS

The present application, is a Continuation of U.S. patent application Ser. No. 13/941,711, filed on Jul. 15, 2013, which is cross-related to the following seventeen applications each listed as: U.S. application Ser. No. 13/941,703, U.S. application Ser. No. 13/941,873, U.S. application Ser. No. 13/941,694, U.S. application Ser. No. 13/941,886, U.S. application Ser. No. 13/941,896, U.S. application Ser. No. 13/941,951, U.S. application Ser. No. 13/941,958, U.S. application Ser. No. 13/941,714, U.S. application Ser. No. 13/941,742, U.S. application Ser. No. 13/941,769, U.S. application Ser. No. 13/941,782, U.S. application Ser. No. 13/941,982, U.S. application Ser. No. 13/941,800, U.S. application Ser. No. 13/941,999, U.S. application Ser. No. 13/942,009, U.S. application Ser. No. 13/942,027, and U.S. application Ser. No. 13/942,048; all of which are filed on even date and the entire contents of which are incorporated herein by reference and are relied upon for claiming the benefit of priority.

BACKGROUND OF THE INVENTION

Field of the Invention

The present invention relates in general to computers, and more particularly to global digests caching in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

Various embodiments are provided for utilizing a global digests cache in deduplication processing in a data deduplication system using a processor device in a computing environment. In one embodiment, by way of example only, a method comprises partitioning input data into input data chunks; calculating input digest values for each of the input data chunks; finding positions of similar repository data in a repository of data for each of the input data chunks; matching input digests of the input data chunks and the repository digests contained in the global digests cache for locating data matches; and using the positions of the similar repository data to locate and linearly load into the global digests cache, digests and digest block boundaries of the similar repository data in a sequence corresponding to a placement order of calculated values of the digests of the similar repository data, the placement order of the calculated values of the digests of the similar repository data correlative to an order in which the input digest values were individually calculated such that the digests of the similar repository data are each individually stored in the global digests cache based on a calculation time and order of when each of the input digests were first calculated when in un-deduplicated form, thereby storing the digests of the similar repository data in a linear and sequential form independent of a deduplicated form by which data the digests describe is stored. Further, the global digest cache comprises a pool of a plurality of sequential arrays of digest entries of the digests and a hash table for pointing to contents within the plurality of sequential arrays.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
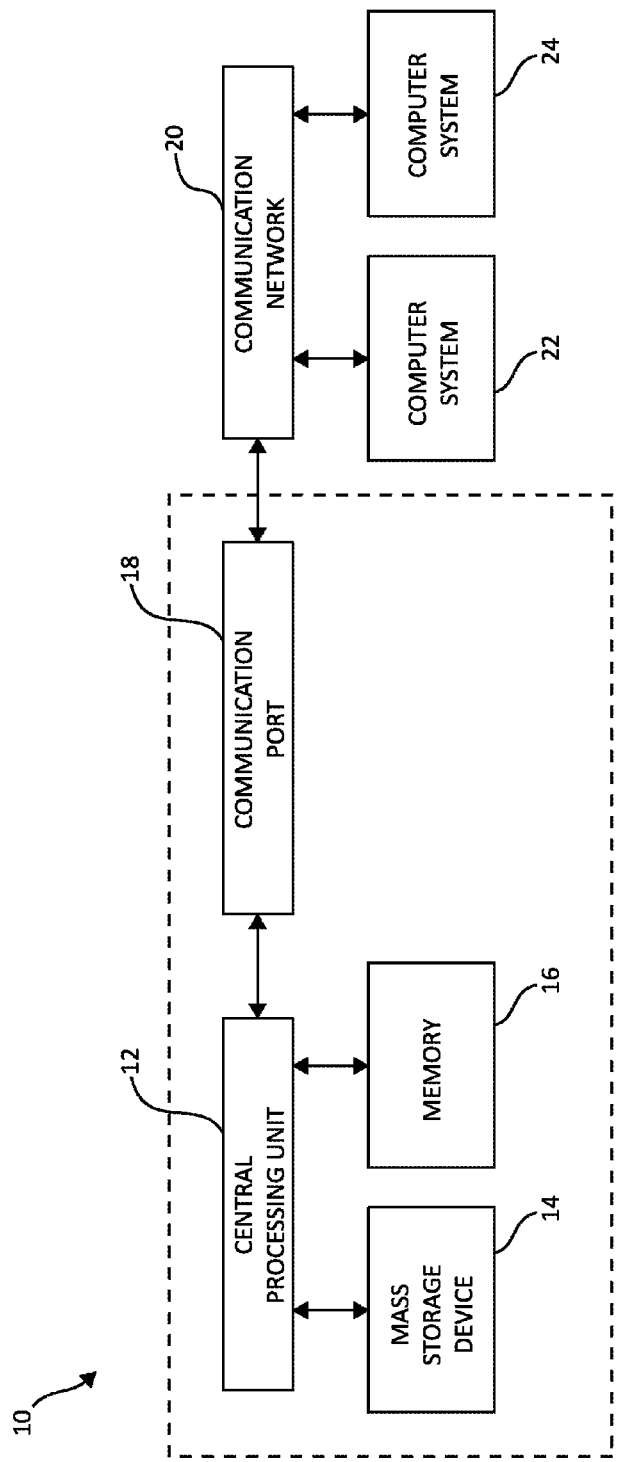
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is partitioned into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.). In one embodiment, a deduplication storage system may be based on maintaining a search optimized index of values known as fingerprints or digests, where a small fingerprint represents a larger block of data in the repository. The fingerprint values may be cryptographic hash values calculated based on the blocks' data. In one embodiment, secure hash algorithm (SHA), e.g. SHA-1 or SHA-256, which are a family of cryptographic hash functions, may be used. Identifying fingerprint matches, using index lookup, enables to store references to data that already exists in a repository. In one embodiment, determining segment boundaries may be performed based on the data itself.

To provide reasonable deduplication in this approach, the mean size of the data blocks based on which fingerprints are generated must be limited to smaller sizes and may not be too large. The reason being that a change of a bit within a data block will probabilistically change the data block's corresponding fingerprint, and thus having large data blocks makes the scheme more sensitive to updates in the data as compared to having small blocks. A typical data block size may range from 4 KB to 64 KB, depending on the type of application and workload. Thus, by way of example only, small data blocks may range in sizes of up to 64 KB, and large data blocks are those data blocks having a size larger than 64 KB.

To support very large repositories scaling to Petabytes (e.g., repositories scaling to at least one Petabyte), the number of fingerprints to store coupled with the size of a fingerprint (ranging between 16 bytes and 64 bytes), becomes prohibitive. For example, for 1 Petabyte of deduplicated data, with a 4 KB mean data block size, and 32 bytes fingerprint size (e.g. of SHA-256), the storage required to store the fingerprints is 8 Terabytes. Maintaining a search optimized data structure for such volumes of fingerprints is difficult, and requires optimization techniques. However existing optimization techniques do not scale to these sizes while maintaining performance. For this reason, to provide reasonable performance, the supported repositories have to be relatively small (on the order of tens of TB). Even for smaller sizes, considerable challenges and run-time costs arise due to the large scale of the fingerprint indexes that create a bottle-neck in deduplication processing.

To solve this problem, in one embodiment, a deduplication system may be based on a two-step approach for searching data patterns during deduplication. In the first step, a large chunk of incoming data (e.g. a few megabytes) is searched in the repository for similar (rather than identical) data chunks of existing data, and the incoming data chunk is partitioned accordingly into intervals and paired with corresponding (similar) repository intervals. In the second step, a byte-wise matching algorithm is applied on pairs of similar intervals, to identify identical sub-intervals, which are already stored in a repository of data. The matching algorithm of the second step relies on reading all the relevant similar data in the repository in order to compare it byte-wise to the input data.

Yet, a problem stemming from a byte-wise comparison of data underlying the matching algorithm of the second step, is that data of roughly the same size and rate as the incoming data should be read from the repository, for comparison purposes. For example, a system processing 1 GB of incoming data per second, should read about 1 GB of data per second from the repository for byte-wise comparison. This requires substantially high capacities of I/O per second of the storage devices storing the repository data, which in turn increases their cost.

Additional trends in information technology coinciding with the above problem are the following: (1) Improvements in the computing ability by increasing CPU speeds and the number of CPU cores. (2) Increase in disk density, while disk throughput remains relatively constant or improving only modestly. This means that there are fewer spindles relative to the data capacity, thus practically reducing the overall throughput. Due to the problem specified above, there is a need to design an alternative solution, to be integrated in a two step deduplication system embodiment specified above, that does not require reading from the repository in high rates/volumes.

Therefore, in one embodiment, by way of example only, additional embodiments address these problem, as well as shifts resource consumption from disks to the CPUs, to benefit from the above trends. The embodiments described herein are integrated within the two-step and scalable deduplication embodiments embodiment described above, and uses a similarity search to focus lookup of digests during deduplication. In one embodiment, a global similarity search is used as a basis for focusing the similarity search for digests of repository data that is most likely to match input data.

The embodiments described herein significantly reduce the capacity of I/O per second required of underlying disks, benefit from the increases in computing ability and in disk density, and considerably reduce the costs of processing, as well as maintenance costs and environmental overhead (e.g. power consumption).

In one embodiment, input data is segmented into small segments (e.g. 4 KB) and a digest (a cryptographic hash value, e.g. SHA1) is calculated for each such segment. First, a similarity search algorithm, as described above, is applied on an input chunk of data (e.g. 16 MB), and the positions of the most similar reference data in the repository are located and found. These positions are then used to lookup the digests of the similar reference data. The digests of all the data contained in the repository are stored and retrieved in a form that corresponds to their occurrence in the data.

Given a position of a section of data contained in the repository, the digests associated with the section of data are efficiently located in the repository and retrieved. Next, these reference digests are loaded into memory, and instead of comparing data to find matches, the input digests and the loaded reference digests are matched.

The described embodiments provide a new fundamental approach for architecting a data deduplication system, which integrates a scalable two step approach of similarity search followed by a search of identical matching segments, with an efficient and cost effective digest/fingerprint based matching algorithm (instead of byte-wise data comparison). The digest/fingerprint based matching algorithm enables to read only a small fraction (1%) of the volume of data required by byte-wise data comparison. The present invention proposed herein, a deduplication system can provide high scalability to very large data repositories, in addition to high efficiency and performance, and reduced costs of processing and hardware.

In one embodiment, by way of example only, the term "similar data" may be referred to as: for any given input data, data which is similar to the input data is defined as data which is mostly the same (i.e. not entirely but at least 50% similar) as the input data. From looking at the data in a binary view (perspective), this means that similar data is data where most (i.e. not entirely but at least 50% similar) of the bytes are the same as the input data.

In one embodiment, by way of example only, the term "similar search" may be referred to as the process of searching for data which is similar to input data in a repository of data. In one embodiment, this process may be performed using a search structure of similarity elements, which is maintained and searched within.

In one embodiment, by way of example only, the term "similarity elements" may be calculated based on the data and facilitate a global search for data which is similar to input data in a repository of data. In general, one or more similarity elements are calculated, and represent, a large (e.g. at least 16 MB) chunk of data.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. It should be noted that in one embodiment the positions may be either physical or logical (i.e. virtual). The positions are of data inside a repository of data. The important property of a 'position' is that given a position (physical or logical) in the repository's data, the data in that position can be efficiently located and accessed. The digest values and the corresponding digest block boundaries are matched with the stored digest values and the corresponding stored digest block boundaries to find data matches.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. The digest values and the corresponding digest block boundaries are matched with the stored digest values and the corresponding stored digest block boundaries to find data matches In one embodiment, the present invention provides a solution for utilizing a similarity search to load into memory the relevant digests from the repository, for efficient deduplication processing. In a data deduplication system, deduplication is performed by partitioning the data into large fixed sized chunks, and for each chunk calculating (2 things—similarity elements and digest blocks/digest values) hash values (digest block/digest value) for similarity search and digest values. The data deduplication system searches for matching similarity values of the chunks in a search structure of similarity values, and finds the positions of similar data in the repository. The data deduplication system uses these positions of similar data to locate and load into memory stored digests of the similar repository data, and matching input and repository digest values to find data matches.

In one embodiment, the present invention provides for efficient calculation of both similarity search values and segmentation (i.e. boundaries) of digest blocks using a single linear calculation of rolling hash values. In a data deduplication system, the input data is partitioned into chunks, and for each chunk a set of rolling hash values is calculated. A single linear scan of the rolling hash values produces both similarity search values and boundaries of the digest blocks of the chunk. Each rolling hash value corresponds to a consecutive window of bytes in byte offsets. The similarity search values are used to search for similar data in the repository. The digest blocks segmentation is used to calculate digest block boundaries and corresponding digest values of the chunk, for digests matching. Each rolling hash value contributes to the calculation of the similarity values and to the calculation of the digest blocks segmentations. Each rolling hash value may be discarded after contributing to the calculations. The described embodiment provides significant processing efficiency and reduction of CPU consumption, as well as considerable performance improvement.

Thus, as described above, the deduplication approach of the present invention uses a two-step process for searching data patterns during deduplication. In the first step, a large chunk of incoming data (e.g. 16 megabytes "MB") is searched in the repository for similar (rather than identical) chunks of existing data, and the incoming chunk is partitioned accordingly into intervals, and paired with corresponding (similar) repository intervals. The similarity search structure (or "index") used in the first step is compact and simple to maintain and search within, because the elements used for a similarity search are very compact relative to the data they represent (e.g. 16 bytes representing 4 megabytes). Further included in the first step, in addition to a calculation of similarity elements, is a calculation of digest segments and respective digest values for the input chunk of data. All these calculations are based on a single calculation of rolling hash values. In the second step, reference digests of the similar repository intervals are retrieved, and then the input digests are matched with the reference digests, to identify data matches.

In one embodiment, in the similarity based deduplication approach as described herein, a stream of input data is partitioned into chunks (e.g. at least 16 MB), and each chunk is processed in two main steps. In the first step a similarity search process is applied, and positions of the most similar reference data in the repository are found. Within this step both similarity search elements and digest segments boundaries are calculated for the input chunk, based on a single linear calculation of rolling hash values. Digest values are calculated for the input chunk based on the produced segmentation, and stored in memory in the sequence of their occurrence in the input data. The positions of similar data are then used to lookup the digests of the similar reference data and load these digests into memory, also in a sequential form. Then, the input digests are matched with the reference digests to form data matches.

When deduplication of an input chunk of data is complete, the input chunk of data's associated digests are stored in the repository, to serve as reference digests for subsequent input data. The digests are stored in a linear form, which is independent of the deduplicated form by which the data these digests describe is stored, and in the sequence of their occurrence in the data. This method of storage enables efficient retrieval of sections of digests, independent of fragmentation characterizing deduplicated storage forms, and thus low on IO and computational resource consumption.

In addition, to solve the bottleneck problem as described above, in one embodiment, a deduplication system, as described herein, may use the two step approach for searching data patterns during deduplication. In the first step, a large chunk of incoming data (e.g. a few megabytes) is searched in the repository for similar (rather than identical) data chunks of existing data, and the incoming data chunk is partitioned accordingly into intervals and paired with corresponding (similar) repository intervals. The similarity index used in this step is very compact and simple to maintain and search within, since the elements used for similarity search are very compact relative to the data they represent (e.g. 16 bytes representing 4 megabytes). Further included in the first step is a calculation of similarity elements as well as digest segments and respective digest values, of the input chunk of data. These calculations are based on a single calculation of rolling hash values. In the second step, reference digests of the similar repository intervals are retrieved, and then the input digests are matched with the reference digests, to identify data matches. This approach works very well on data sets where the generations of data have a low to moderate change rate (roughly up to 30% change rate) relative to previous generations. Such change rates are very typical for the most common use cases, and are specifically typical for data backup environments.

However, there are two main effects on the data that can impact the results of the similarity search step. One effect is a high change rate, namely a given generation of data is considerably different than a previous generation of the same data set. A high change rate (e.g. more than 30%), may cause the similarity elements calculated for an incoming chunk of data to be considerably different than any of the similarity elements already existing in the repository, and thus may impact the ability to find appropriate similar data in the repository. A second effect is internal reordering of sections in the data. Specifically, mixing sections of data among chunks that are processed for similarity, relative to their positions in previous generations, may again cause the similarity elements calculated for an incoming chunk to be different than existing similarity elements, thus possibly impacting the ability to find appropriate similar data in the repository. A typical use case that can cause such reordering in a backup environment, is multiplexing of the backed-up data. In such a use case a data set is read by concurrent backup processes, which compete on reading sections of the data set, resulting in each stream being constructed from sections of data coming from arbitrary positions in the data set.

A further observation regarding multiplexing is that although this may cause sections of the data to arrive in a mixed order relative to previous generations, the data that is steamed in within the concurrent backup streams is related. Namely, repository data that is identified as similar with regards to a specific stream, may likely be also relevant for other concurrent streams.

Thus a need exists to design a solution for the problem specified above, that will enable to achieve improved deduplication results for workloads with high change rates, or with reordering within the data, and for workload where multiplexing is used. This solution should also benefit from the characteristic of multiplexed data specified above.

In one embodiment, by way of example only, the present invention solves this problem, as well as benefits from the multiplexed data characteristics. The present invention provides considerable additional improvement in the deduplication results for high change rate and/or internally reordered workloads, further enhancing the effectiveness and scalability of similarity based deduplication.

In one embodiment, by way of example only, in the first step, as described herein, a similarity search process is applied on an input chunk of data (e.g. 16 MB), and the positions of the most similar reference data in the repository are found. Within this step both similarity search elements and digest segments boundaries are calculated for the input chunk, based on a single linear calculation of rolling hash values. Digest values are calculated for the input chunk based on the produced segmentation, and stored in a memory buffer in the sequence of their occurrence in the input data. The positions of similar data are then used to lookup the digests of the similar reference data. In the present invention, the digests of the data contained in the repository are stored and retrieved in a form that corresponds to their occurrence in the data. Given a position and size of a section of data contained in the repository, its associated digests are efficiently located in the repository and retrieved.

In one embodiment, the present invention loads the digests of the similar repository data into a global cache of digests (rather than a local cache). This cache is global in the sense that it contains a plurality of repository digests that were loaded for processing and comparison, not only in a current operation of processing an individual chunk of incoming data, but rather in multiple such operations that occurred recently. After loading digests of similar repository intervals into the global cache, the digests matching process proceeds to search input digests in the global cache (rather than in a local cache). The global cache consists of a pool of sequential arrays of digest entries, and a hash table. The sequential arrays are used to load sequences of repository digests into memory, and the hash table enables to efficiently search within the cache's contents. The hash table entries point to contents within the sequential arrays.

It should be noted that without a global digests cache, each individual operation of processing an input chunk of data would load its relevant repository digests, and then remove this contents from memory once the chunk processing operation is complete. With the global digests cache, each chunk processing operation loads its relevant repository digests into memory, however does not remove this contents from memory after processing. Instead, the removal of digests from the global cache is governed by a Least Recently Used (LRU) policy, to maximize the reuse potential of digests already loaded into the cache. In one embodiment the LRU policy is applied on the sequential arrays of digests. Namely, when new contents should be loaded and there are no empty arrays, the least recently used array (which is not in current usage) is used to load the required contents.

Essentially, the global cache reflects a certain window of time backwards from the current time, in terms of digests that were processed for deduplication. When searching for input digests, not only the digests loaded from the repository by the current chunk processing operation are considered, but also digests that were previously loaded by other chunk processing operations, within the time window reflected by the cache. Digests that were previously loaded in a recent time frame may be very relevant for a current chunk processing operation. For instance, in cases of reordering of sections in the data between generations of a data set, and especially with multiplexing, it is very probable that digests loaded by different operations or different streams will be relevant for deduplication of other operations or streams currently being processed. For this reason, the global digests cache considerably improves the deduplication results for internally reordered and/or high change rate workloads, further enhancing the effectiveness and scalability of similarity based deduplication systems.

In one embodiment, the present invention provides for utilizing a global digests cache in a similarity based deduplication process to improve the deduplication results, especially for internally reordered and/or high change rate workloads. In one embodiment of the data deduplication system, a deduplication process includes partitioning the data into chunks, and for each chunk calculating digest values, finding the positions of similar data in the repository, locating and loading the digests of the similar repository data into a global memory cache of digests, where the cache contains digests that were loaded also by other deduplication operations, and finally matching input and repository digests contained in the global memory cache of digests to find data matches.

In an alternative embodiment, the present invention provides for utilizing a global digests cache in the similarity based deduplication process, specifically in a case where similar data is not found in the repository. In one embodiment of the data deduplication system, a deduplication process includes partitioning the data into chunks, and for each chunk calculating digest values, and if a search for similar data in the repository does not provide results then matching input and repository digests contained in a global memory cache of digests to find data matches.

In an alternative embodiment, the present invention provides for utilizing a global digests cache in the similarity based deduplication process, where if similar repository data is found, preferring matches with repository digests of the similar repository data (vs. matches with digests of other repository data which was not determined as the similar repository data). In one embodiment of the data deduplication system, a deduplication process includes partitioning the data into chunks, and for each chunk calculating digest values, finding the positions of similar data in the repository, locating and loading the digests of the similar repository data into a global memory cache of digests, matching input and repository digests contained in the global memory cache of digests, and preferring matches with repository digests in the cache which are of the similar repository data.

In an alternative embodiment, the present invention provides for a sparse hash table within a global digests cache, where sampling is applied to load digests into the hash table, and the sparseness enables to increase the time window reflected by the global cache or alternatively reduce the memory consumption of the global cache. In one embodiment of the data deduplication system, a deduplication process includes partitioning the data into chunks, and for each chunk calculating digest values, finding the positions of similar data in the repository, locating and loading the digests of the similar repository data into a global memory cache of digests, and loading a sample of the repository digests into a search mechanism within the cache. The sampling of the repository digests is applied for loading the repository digests into the hash table. The hash table is a sparse hash table and the sparseness of the hash table enables to increase a time window reflected by the global digests cache and also reduces a memory consumption of the global digests cache. The sample may include a first digest of each fixed sized sequence of repository digests. A density of the sampling may be tuned for each workload, or for each section of input data, in accordance with the deduplication results of the workload or the section of the input data.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
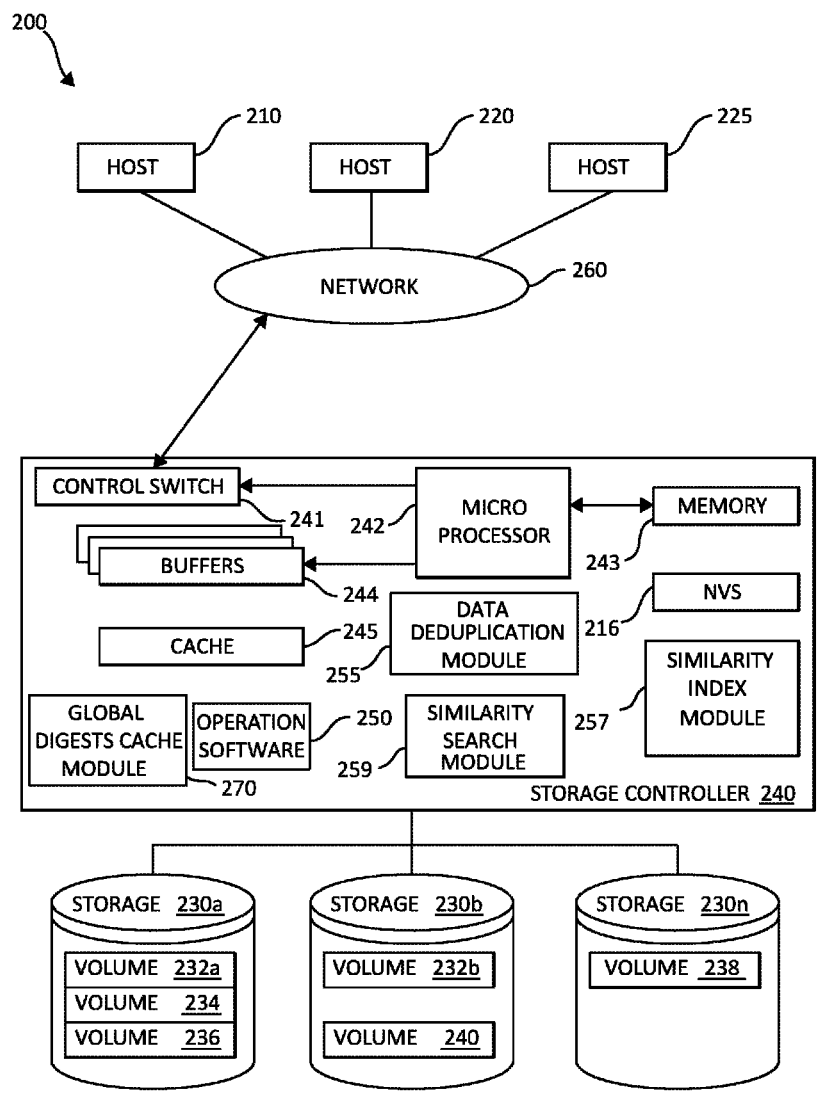
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Each of the hosts, 210, 220, and 225 may also be in communication and association with the storage controller 240. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a similarity index module 257 (e.g., a similarity search structure), a similarity search module 259, and a global digests cache module 270. The data duplication module 255, the similarity index module 257, the similarity search module 259, and the global digests cache module 270 may work in conjunction with each and every component of the storage controller 240, the hosts 210, 220, 225, and storage devices 230. The data duplication module 255, the similarity index module 257, the similarity search module 259, and the global digests cache module 270 may be structurally one complete module or may be associated and/or included with other individual modules. The data duplication module 255, the similarity index module 257, the similarity search module 259, and the global digests cache module 270 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, the similarity search module 259, and the global digests cache module 270, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the similarity index module 257, the similarity search module 259, and the global digests cache module 270 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the similarity index module 257, the similarity search module 259, and the global digests cache module 270 may also be located in the cache 245 or other components. As such, the data duplication module 255, the similarity index module 257, the similarity search module 259, and the global digests cache module 270 may be used as needed, based upon the storage architecture and users preferences.

As mentioned above, in one embodiment, the input data is partitioned into large fixed size chunks (e.g. 16 MB), and a similarity search procedure is applied for each input chunk. A similarity search procedure calculates compact similarity elements, based on the input chunk of data, and searches for matching similarity elements stored in a compact search structure (i.e. index) in the repository. The size of the similarity elements stored per each chunk of data is typically 32 bytes (where the chunk size is a few megabytes), thus making the search structure storing the similarity elements very compact and simple to maintain and search within.

The similarity elements are calculated by calculating rolling hash values for the chunk's data, namely producing a rolling hash value for each consecutive window of bytes in a byte offset, and then selecting specific hash values and associated positions (not necessarily the exact positions of these hash values) to be the similarity elements of the chunk.

One important aspect and novelty provided by the present invention is that a single linear calculation of rolling hash values, which is a computationally expensive operation, serves as basis for calculating both the similarity elements of a chunk (for a similarity search) and the segmentation of the chunk's data into digest blocks (for finding exact matches). Each rolling hash value is added to the calculation of the similarity elements as well as to the calculation of the digest blocks segmentation. After being added to the two calculations, a rolling hash value can be discarded, as the need to store the rolling hash values is minimized or eliminated. This algorithmic element provides significant efficiency and reduction of CPU consumption, as well as considerable performance improvement.

In one embodiment, the similarity search procedure of the present invention produces two types of output. The first type of output is a set of positions of the most similar reference data in the repository. The second type of output is the digests of the input chunk, comprising of the segmentation to digest blocks and the digest values corresponding to the digest blocks, where the digest values are calculated based on the data of the digest blocks.

In one embodiment, the digests are stored in the repository in a form that corresponds to the digests occurrence in the data. Given a position in the repository and size of a section of data, the location in the repository of the digests corresponding to that interval of data is efficiently determined. The positions produced by the similarity search procedure are then used to lookup the stored digests of the similar reference data, and to load these reference digests into memory. Then, rather than comparing data, the input digests and the loaded reference digests are matched. The matching process is performed by loading the reference digests into a compact search structure of digests in memory, and then for each input digest, querying the search structure of digests for existence of that digest value. Search in the search structure of digests is performed based on the digest values. If a match is found, then the input data associated with that digest is determined to be found in the repository and the position of the input data in the repository is determined based on the reference digest's position in the repository. In this case, the identity between the input data covered by the input digest, and the repository data covered by the matching reference digest, is recorded. If a match is not found then the input data associated with that digest is determined to be not found in the repository, and is recorded as new data. In one embodiment, the similarity search structure is a global search structure of similarity elements, and a memory search structure of digests' is a local search structure of digests in memory. The search in the memory search structure of digests is performed by the digest values.

Figure 3:
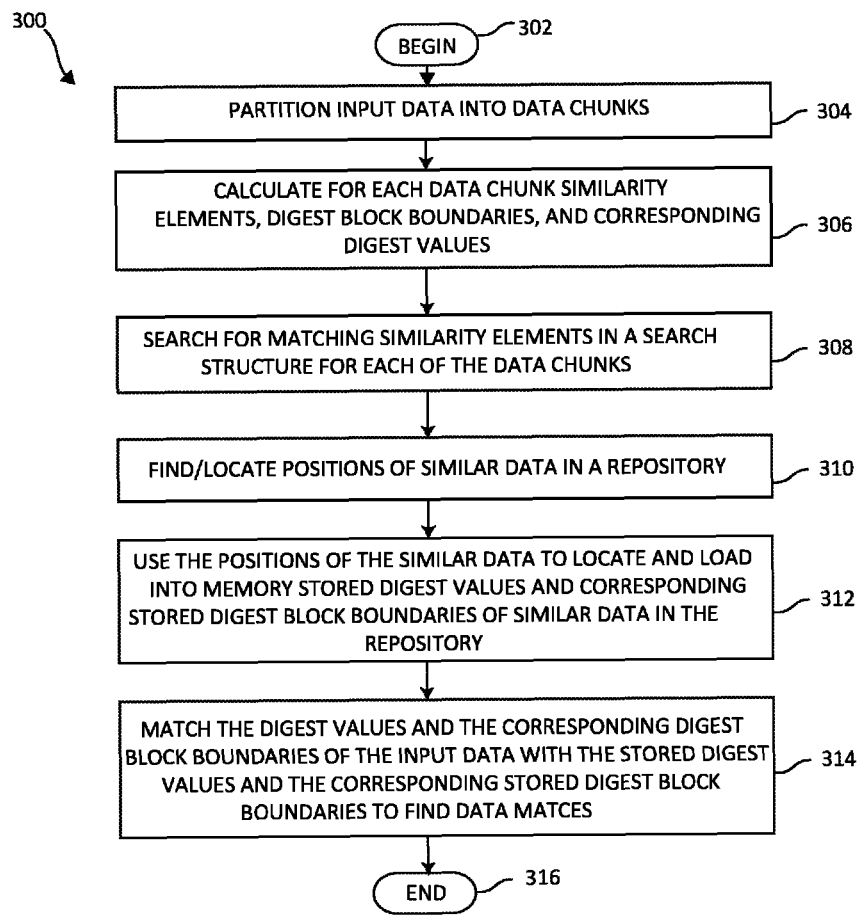
FIG. 3 is a flowchart illustrating an exemplary method for digest retrieval based on similarity search in deduplication processing in a data deduplication system in which aspects of the present invention may be realized.

FIG. 3 is a flowchart illustrating an exemplary method 300 for digest retrieval based on similarity search in deduplication processing in a data deduplication system in which aspects of the present invention may be realized. The method 300 begins (step 302). The method 300 partitions input data into data chunks (step 304). The input data may be partitioned into fixed sized data chunks. The method 300 calculates, for each of the data chunks, similarity elements, digest block boundaries, and corresponding digest values are calculated (step 306). The method 300 searches for matching similarity elements in a search structure (i.e. index) for each of the data chunks (which may be fixed size data chunks) (step 308). The positions of the similar data in a repository (e.g., a repository of data) are located (step 310). The method 300 uses the positions of the similar data to locate and load into memory stored digest values and corresponding stored digest block boundaries of the similar data in the repository (step 312). The method 300 matches the digest values and the corresponding digest block boundaries of the input data with the stored digest values and the corresponding stored digest block boundaries to find data matches (step 314). The method 300 ends (step 316).

Figure 4:
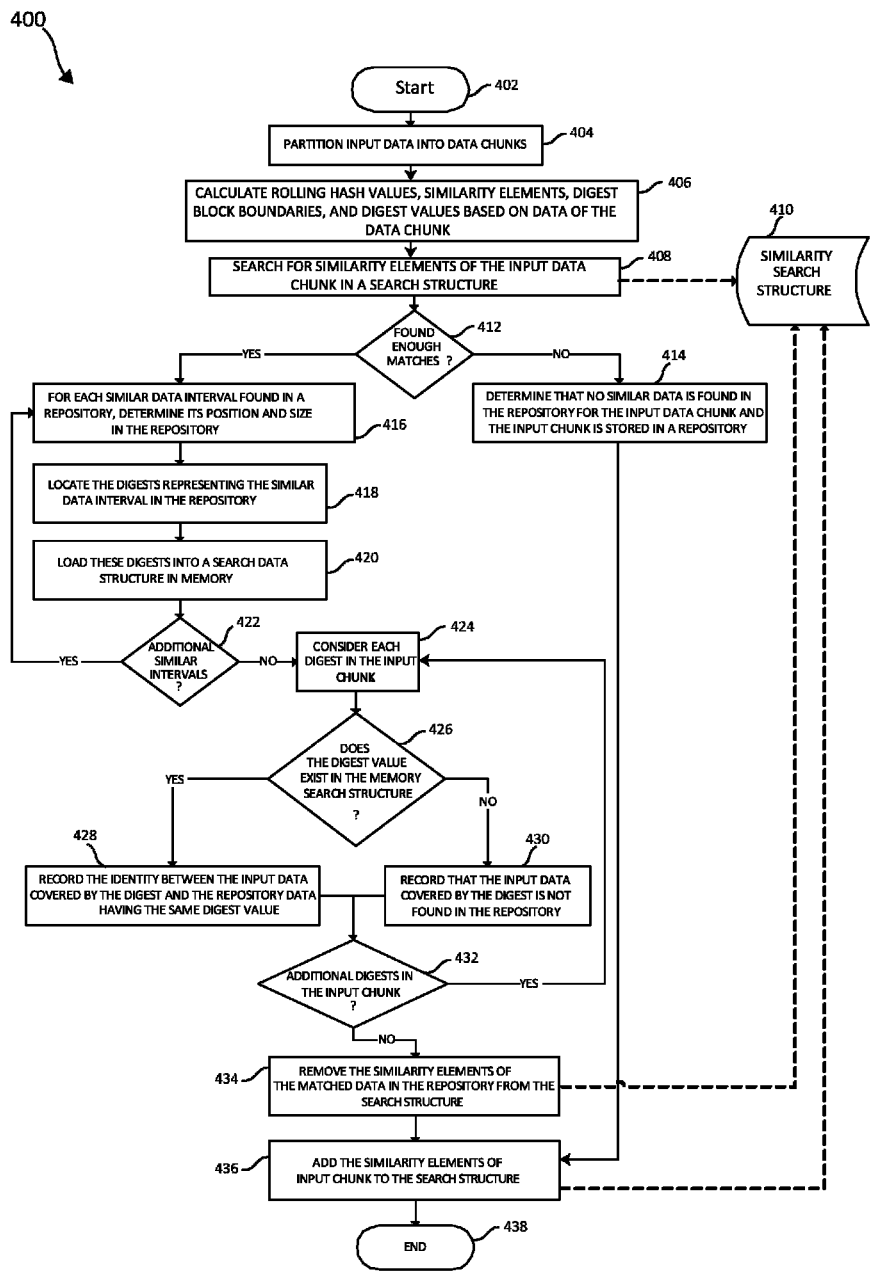
FIG. 4 is a flowchart illustrating an exemplary alternative method for digest retrieval based on similarity search in deduplication processing in a data deduplication system in which aspects of the present invention may be realized.

FIG. 4 is a flowchart illustrating an exemplary alternative method 400 for digest retrieval based on similarity search in deduplication processing in a data deduplication system in which aspects of the present invention may be realized. The method 400 begins (step 402). The method 400 partitions the input data into chunks (e.g., partitions the input data into large fixed size chunks) (step 404), and for an input data chunk calculates rolling hash values, similarity elements, digest block boundaries, and digest values based on data of the input data chunk (step 406). The method 400 searches for similarity elements of the input data chunk in a similarity search structure (i.e. index) (step 408 and 410). The method 400 determines if there are enough or a sufficient amount of matching similarity elements (step 412). If not enough matching similarity elements are found then the method 400 determines that no similar data is found in the repository for the input data chunk, and the data of the input chunk is stored in a repository (step 414) and then the method 400 ends (step 438). If enough similarity elements are found, then for each similar data interval found in a repository, the method 400 determines the position and size of each similar data interval in the repository (step 416). The method 400 locates the digests representing the similar data interval in the repository (step 418). The method 400 loads these digests into a search data structure of digests in memory (step 420). The method 400 determines if there are any additional similar data intervals (step 422). If yes, the method 400 returns to step 416. If no, the method 400 considers each digest of the input data chunk (step 424). The method 400 determines if the digest value exists in the memory search structure of digests (step 426). If yes, the method 400 records the identity between the input data covered by the digest and the repository data having the matching digest value (step 428). If no, the method 400 records that the input data covered by the digest is not found in the repository (step 430). From both steps 428 and 430, the method 400 determines if there are additional digests of the input data chunk (step 432). If yes, the method 400 returns to step 424. If no, method 400 removes the similarity elements of the matched data in the repository from the similarity search structure (step 434 and step 410). The method 400 adds the similarity elements of the input data chunk to the similarity search structure (step 436). The method 400 ends (step 438).

Figure 5:
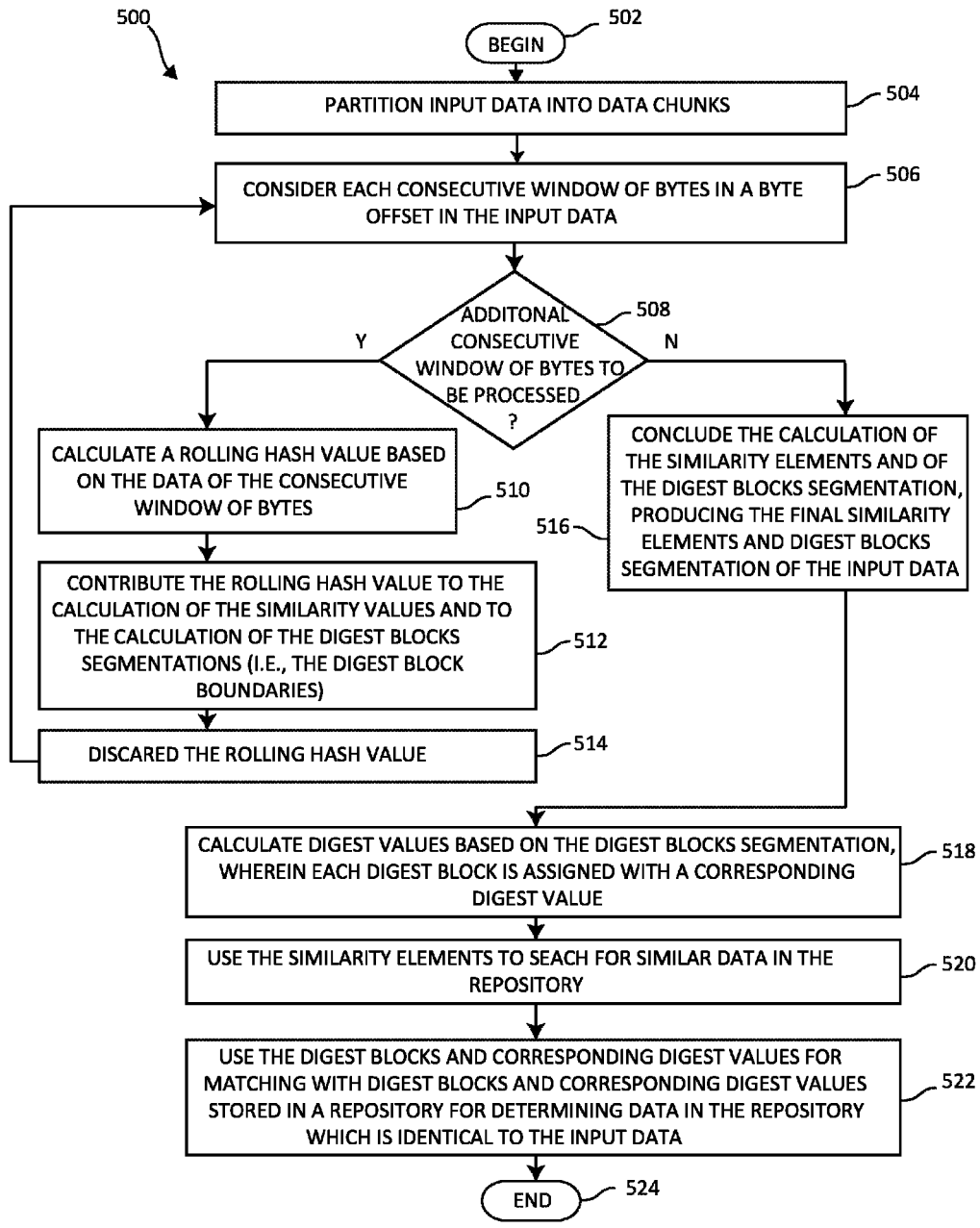
FIG. 5 is a flowchart illustrating an exemplary method for efficient calculation of both similarity search values and boundaries of digest blocks using a single linear calculation of rolling hash values in a data deduplication system in which aspects of the present invention may be realized.

FIG. 5 is a flowchart illustrating an exemplary method 500 for efficient calculation of both similarity search values and boundaries of digest blocks using a single linear calculation of rolling hash values in a data deduplication system in which aspects of the present invention may be realized. The method 500 begins (step 502). The method 500 partitions input data into data chunks (steps 504). The data chunks may be fixed sized data chunks. The method 500 considers each consecutive window of bytes in a byte offset in the input data (step 506). The method 500 determines if there is an additional consecutive window of bytes to be processed (step 508). If yes, the method 500 calculates a rolling hash value based on the data of the consecutive window of bytes (step 510). The method 500 contributes the rolling hash value to the calculation of the similarity values and to the calculation of the digest blocks segmentations (i.e., the digest block boundaries) (step 512). The method 500 discards the rolling hash value (step 514), and returns to step 506. If no, the method 500 concludes the calculation of the similarity elements and of the digest blocks segmentation, producing the final similarity elements and digest blocks segmentation of the input data (step 516). The method 500 calculates digest values based on the digest blocks segmentation, wherein each digest block is assigned with a corresponding digest value (step 518). The similarity elements are used to search for similar data in the repository (step 520). The digest blocks and corresponding digest values are used for matching with digest blocks and corresponding digest values stored in a repository for determining data in the repository which is identical to the input data (step 522). The method 500 ends (step 524).

Figure 6:
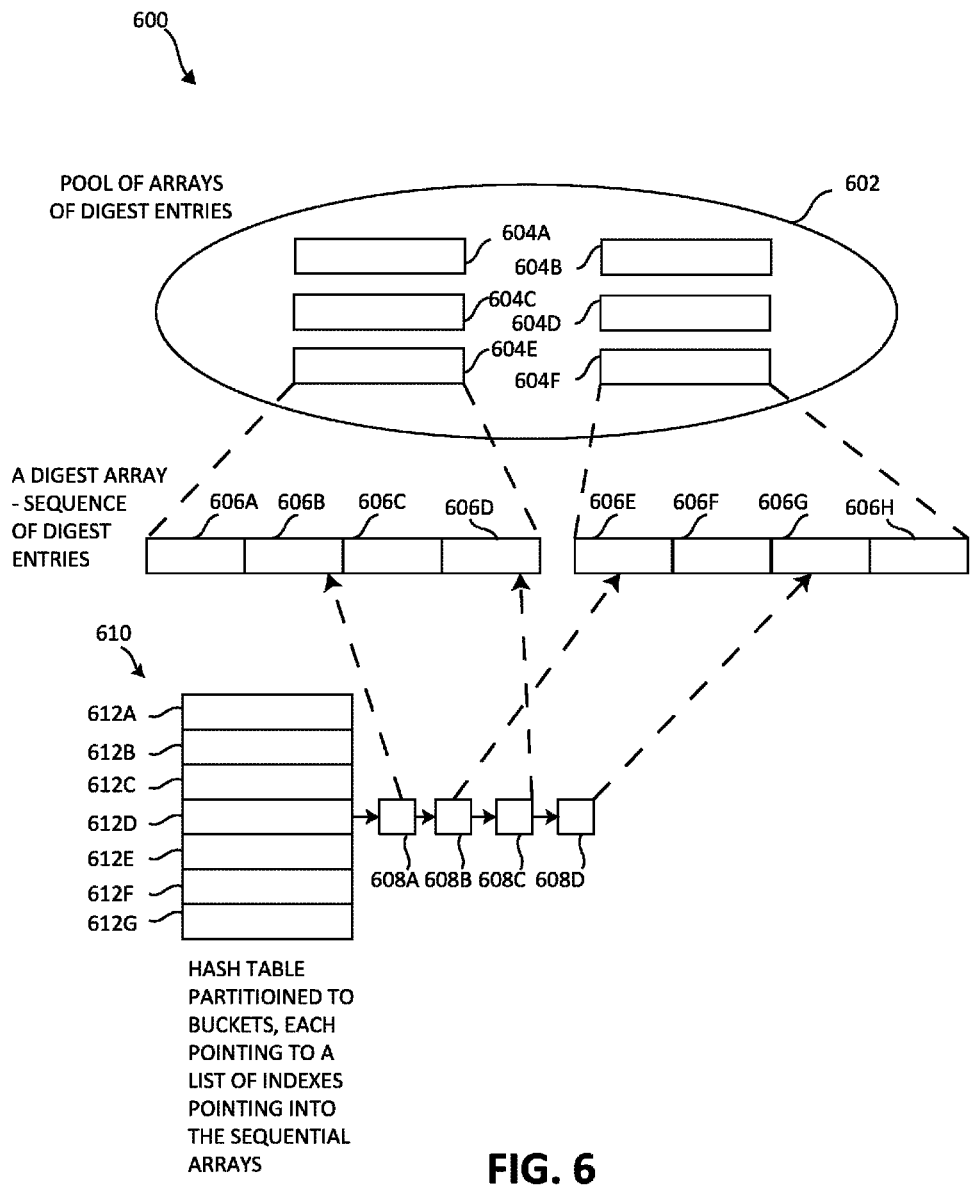
FIG. 6 is a block diagram illustrating a global digests cache structure containing which aspects of the present invention may be realized

In one embodiment, as described below, the global cache consists of a pool of sequential arrays of digest entries, and a hash table. FIG. 6 is a schematic diagram of the cache structure. The arrays are used to load sequences of repository digests into the cache, where each array being used contains a specific section of repository digests in a sequential form. Each digest entry in an array contains the digest value, along with the position and size of its associated segment in the data. The hash table contains entries, which point into the arrays. Each digest being stored in the table contributes an entry inside the table, where the entry is linked to the entries list of the table bucket where the digest value is hashed to. Each entry consists of two compact indexes, one pointing to a digests array, and the second pointing to a digest entry position inside the array. The hash table enables to efficiently search within the cache's contents.

FIG. 6 is a block diagram illustrating a global digests cache structure which aspects of the present invention may be realized. In one embodiment, as described in FIG. 6, the global cache 600 consists of a pool 602 of sequential arrays of digest entries 604 (shown in FIG. 6 as 604A-F), and a hash table 610. Within the global digests cache 600 are digest arrays 604 (shown in FIG. 6 as 604A-F), where each of the digest arrays may contain a sequence of digest entries 606 (shown in FIG. 6 as 606A-H). Sequences of repository digests are loaded into the digest arrays 606, where each array being used contains a specific section of repository digests in a sequential form. Each digest entry in an array contains the digest value, along with the position and size of its associated segment in the data. The hash table 610 contains buckets 612 (shown in FIG. 6 as 612A-G) where digest values are hashed to. Each bucket points to a list of entries 608, where each entry points into the digest arrays 606. Each digest being stored in the hash table 610 contributes an entry 608A-D inside the hash table 610, where the entry 608A-D is linked to the entries list 608 of the table bucket 612A-G where the digest value is hashed to. Each entry 608A-D consists of two compact indexes, one pointing to a digests array 606, and the second pointing to a digest entry position inside the array 606A-H. The hash table enables to efficiently search within the cache's contents.

In one embodiment, a deduplication process of an input chunk of data (see FIG. 7 below) first applies a similarity search step to find the positions of the most similar reference data in the repository. In addition, the digest segments and respective values of the input chunk are calculated and stored in a memory array in the sequence of their occurrence in the input data. The positions of similar data are then used to lookup the digests of the similar sections of data in the repository, and load these sequences of digests into the global digests cache. Given a position and size of a section of similar data contained in the repository, its associated digests are efficiently located and loaded into an array in the global digests cache, in a form that corresponds to their occurrence in the data. Each continuous sequence of the digests being loaded into the cache is copied into a separate digests array of the cache, and the array is labeled with the repository position and size of the reference data interval whose associated sequence of digests it now contains. If the digests of a given interval of repository data are already loaded in the global digests cache, at the time when the deduplication process requests to load these digests, then these digests are not reloaded, as being already available for access in the cache. The global digests cache further implements a Least Recently Used (LRU) policy for reusing arrays of digests. Next, the deduplication process of an input chunk searches for each of the input digest values in the global cache, and if matching digests exist in the global cache, then the cache provides access to the digests arrays containing these matching digests. Searching within the global cache is done by searching first in the hash table, and then accessing the arrays of digests pointed to from the relevant entries in the hash table. As both the input and repository digests are stored in sequential arrays, extension of matching digests sequences in a forward and backward directions may be applied. The largest sequence of matched digests is selected, and the identity between the input data and the repository data covered by the selected sequence of matched digests is recorded.

An additional important use of the global digests cache is using the cache as a window into the data recently processed by the system to try and find data matches in cases where the similarity search step cannot find any similar data in the repository. In workloads characterized by high change rates and/or high internal reordering, these effects can modify the similarity elements calculated in the similarity search step, thus causing selection of data whose commonalities with the input data are limited, or at a worst case causing inability to find similar data in the repository. In such cases, the present includes a step that searches for input digests in the global digests cache, even if the previous step of similarity search did not find similar data, and thus did not enable to load relevant digests into the cache. In cases of high internal reordering, multiplexing, or high change rate, affecting the effectiveness of similarity search, it is considerably probable that the global cache will indeed contain recently processed digests which are relevant for matching with the input digests, and therefore enable to find additional data matches and improve the deduplication results. If a search for similar data in the repository does not provide results then the present invention matches input and repository digests contained in a global memory cache of digests to find data matches.

Thus, based upon the foregoing, if the step of similarity search succeeds in finding similar repository data (as it normally does), when the next step of digests matching searches for input digests in the global cache and identifies matching digests, it follows a policy of preferring matches to repository digests which are contained in the data intervals that were determined as similar by the previous similarity search step. The reason for that is that the similarity search step has a view of all the data in the repository, and applies logic to select the best data in the repository, which is expected to yield good and sufficiently large commonalities with the input data. This policy yields high quality matches in terms of producing longest sequences of matched input and repository digests. This is beneficial for improving the deduplication results and for improving the overall storage and processing efficiency.

Figure 7:
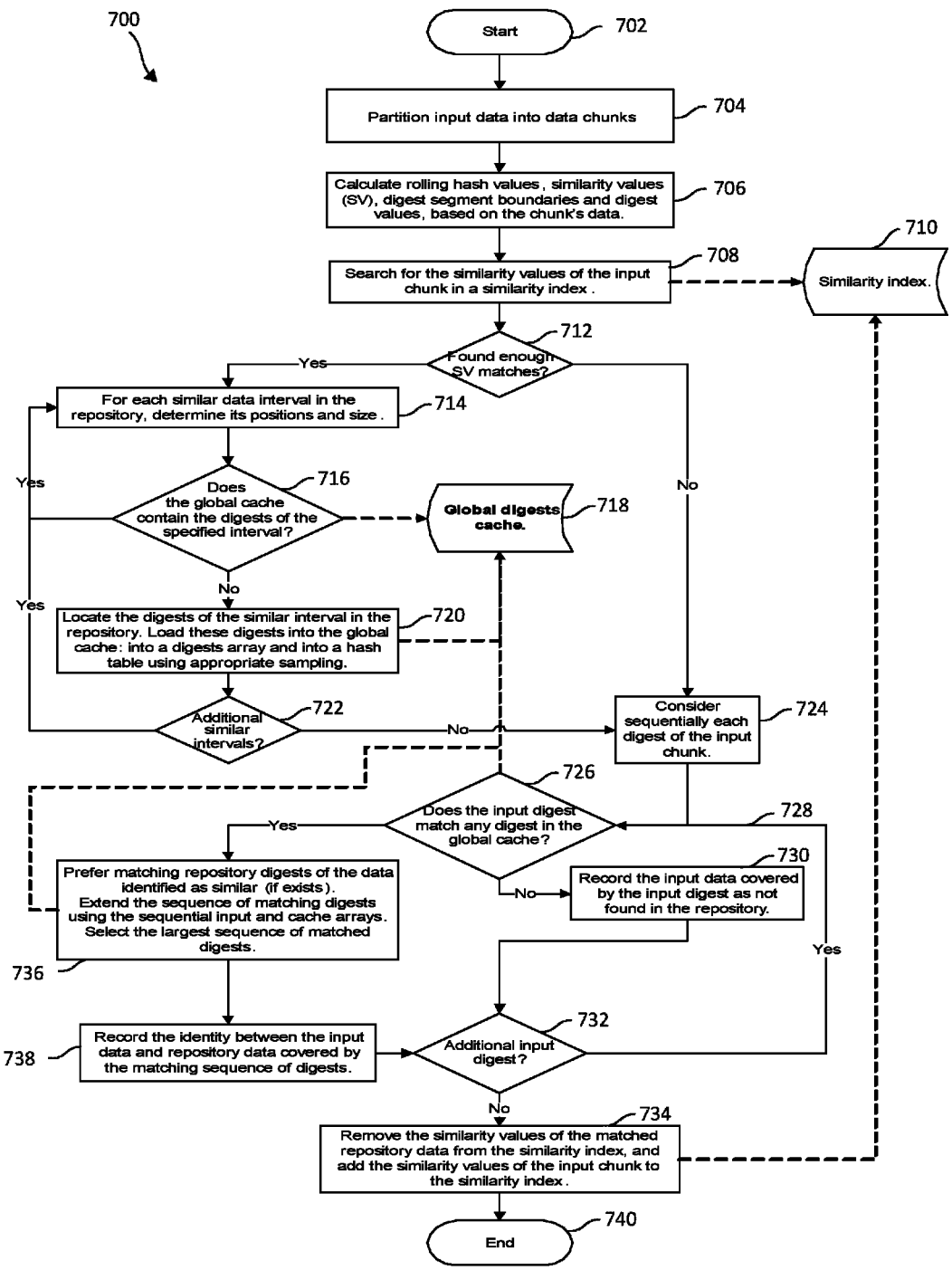
FIG. 7 is a flowchart illustrating an exemplary method for utilizing a global digests cache in a deduplication operation in a data deduplication system in which aspects of the present invention may be realized.

FIG. 7 is a flowchart illustrating an exemplary method 700 for utilizing a global digests cache in a deduplication process in a data deduplication system in which aspects of the present invention may be realized. The method 700 begins (step 702). The method 700 partitions the input data into chunks (e.g., partitions the input data into large fixed size chunks) (step 704), and for an input data chunk calculates rolling hash values, similarity values (SV), digest segment boundaries and digest values, based on the data of the input data chunk (step 706). The method 700 searches for similarity values of the input data chunk in a similarity index (step 708 and 710). The method 700 determines if there are enough and/or a sufficient amount of matching similarity values (step 712). If not enough matching similarity values are found then the method 700 sequentially considers each digest of the input chunk (step 724). If enough similarity values are found, then for each similar data interval found in a repository, the method 700 determines the position and size of each similar data interval in the repository (step 714). The method 700 determines if a global digests cache (GDC) contains the digests of a specified interval (step 716 and step 718). If yes, the method 700 returns to step 714. If no, the method 700 locates the digests representing the similar data interval in the repository and loads these digests into the global digests cache, namely into a digests array and into a hash table using appropriate sampling (step 720 and step 718).

The method 700 determines if there are any additional similar data intervals (step 722). If yes, the method 700 returns to step 714. If no, the method 700 considers each digest of the input chunk (step 724). The method 700 determines if the input digest matches any digest in the global digests cache (step 726). If no, the method 700 records the input data covered by the digest as not found and/or located in the repository (step 730). If the method 700 determines that the input digest does match at least one digest in the global digests cache, the method 700 prefers matching repository digests of the data identified as similar data (if exits), extends the sequence of matching digests using the sequential input and cache array, and selects a largest sequence of matched digests (step 736). The method 700 records the identify between the input data and repository data covered by the matching sequences of digests (step 738). From both steps 738 and 730, the method 700 determines if there are additional digests of the input data chunk (step 732). If yes, the method 700 returns to step 726. If no, the method 700 removes the similarity values of the matched data in the repository from the similarity search index (step 734 and step 710). The method 700 ends (step 738).

Figure 8:
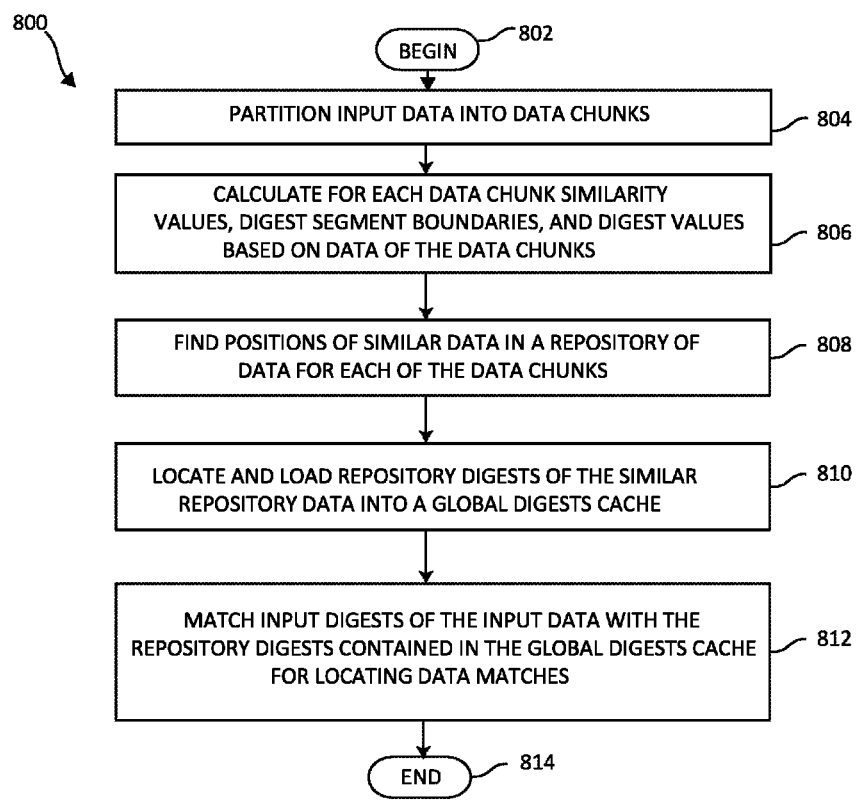
FIG. 8 is a flowchart illustrating an exemplary alternative method for utilizing a global digests cache in a deduplication operation in a data deduplication system in which aspects of the present invention may be realized

FIG. 8 is a flowchart illustrating an exemplary alternative method 800 for utilizing a global digests cache in deduplication processing in a data deduplication system in which aspects of the present invention may be realized. The method 800 begins (step 802). The method 800 partitions the input data into chunks (step 804). The method 800, calculates for each data chunk similarity values, digest segment boundaries and digest values, based on the data of the input data chunk (step 806). The method 800 finds positions of similar data in a repository of data for each of the data chunks (step 808). The method 800 locates and loads repository digests of the similar repository data into a global digests cache (step 810. The method 800 matches input digests of the input data with the repository digests contained in the global digests cache for locating data matches (step 812). The method 800 ends (step 814).

In one embodiment, the hash table of the global digests cache contains sparse contents using sampling. In one embodiment, when a sequence of digests is loaded from the repository into the global digests cache, the full sequence of digests is loaded into a memory array in the cache, however only a sample of the full sequence of digests is loaded into the cache's hash table. An example for a sampling policy is loading into the hash table a first digest of each fixed size subsequence of digests (the size of a subsequence can be for example 4 digests). The sparseness enables to reduce the memory consumption of the hash table, while maintaining same deduplication results, or alternatively extend the time window reflected by the global cache while using a same amount of memory. When a sparse hash table is applied, each and every input digest should be searched in the hash table during a deduplication process, even digests that are part of an extension of a matched sequence of digests. With sampling applied, the deduplication process has to locate all the anchor matching digests and apply extensions, and cannot avoid the search of any of the input digests. Therefore the sparseness provides the benefit of saving memory consumption or alternatively extending the time window reflected by the global cache, in exchange for additional search operations.

Different workloads streamed into a deduplication system may be characterized by varying degrees of difficulty to achieve effective deduplication. Workloads characterized by higher changes rates and/or higher level of internal reordering, are generally more difficult for deduplication. Such workloads may benefit from having higher density of digests in the hash table of the global digests cache, in order to increase the probability of finding matching reference data. On the other hand for workloads that allow easier deduplication, less density, i.e. more sparseness, of digests can be maintained in the hash table. Therefore, in one embodiment the level of sampling is tuned for each deduplication process of a stream of incoming data in accordance with its deduplication results. As the deduplication results are better, the digests sparseness in the hash table can be higher, and as the deduplication results are lower, the digests sparseness can be lower until sampling is completely disabled. This enables the hash table contents to be more effective in facilitating efficient deduplication for the different types of workloads.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for utilizing a global digests cache in a deduplication process in a data deduplication system using a processor device in a computing environment, comprising:
partitioning input data into input data chunks;
calculating input digest values for each of the input data chunks;
finding positions of similar repository data in a repository of data for each of the input data chunks;
matching input digests of the input data chunks and the repository digests contained in the global digests cache for locating data matches; and
using the positions of the similar repository data to locate and linearly load into the global digests cache, digests and digest block boundaries of the similar repository data in a sequence corresponding to a placement order of calculated values of the digests of the similar repository data, the placement order of the calculated values of the digests of the similar repository data correlative to an order in which the input digest values were individually calculated such that the digests of the similar repository data are each individually stored in the global digests cache based on a calculation time and order of when each of the input digests were first calculated when in un-deduplicated form, thereby storing the digests of the similar repository data in a linear and sequential form independent of a deduplicated form by which data the digests describe is stored, wherein the global digest cache comprises a pool of a plurality of sequential arrays of digest entries of the digests and a hash table for pointing to contents within the plurality of sequential arrays.

2. The method of claim 1, wherein the global digests cache contains a plurality of digests previously loaded by a plurality of deduplication processes.

3. The method of claim 2, further including reusing at least one of the plurality of sequential arrays of digest entries of the global digests cache according to a least recently used (LRU) policy.

4. The method of claim 3, further including applying the LRU policy on the plurality of sequential arrays of the digest entries of the plurality of digests in the global digests cache.

5. The method of claim 4, further including searching for the input digests by considering both the plurality of digests previously loaded by the plurality of deduplication processes and the digests of the similar repository data currently loaded into the global digests cache.

6. The method of claim 1, further including performing one of:
calculating similarity values for each of the input data chunks,
searching for matching similarity values in a search structure containing the similarity values, and
matching the digest values of the input data with the repository digest values of the repository digests loaded into the global digests cache for locating the data matches.

7. The method of claim 1, further including matching the input digests of the input data and the repository digests contained in the global digests cache for finding data matches if a search for the similar repository data in the repository fails to find the similar repository data.

8. The method of claim 1, further including preferring to match the input digests of the input data and the repository digests contained the global digests cache for repository data identified as similar to the input data if a search for the similar repository data in the repository finds the similar repository data.

9. A system for utilizing a global digests cache in a deduplication process for improving efficiency for internally reordered and high change rate workloads in a data deduplication system of a computing environment, the system comprising:
the data deduplication system;
the global digests cache in association with the data deduplication system;
a repository operating in the data deduplication system in communication with the global digests cache; and
at least one processor device operable in the computing storage environment for controlling the data deduplication system, wherein the at least one processor device:
partitions input data into input data chunks,
calculates input digest values for each of the input data chunks,
finds positions of similar repository data in a repository of data for each of the input data chunks,
matches input digests of the input data chunks and the repository digests contained in the global digests cache for locating data matches, and
uses the positions of the similar repository data to locate and linearly load into the global digests cache, digests and digest block boundaries of the similar repository data in a sequence corresponding to a placement order of calculated values of the digests of the similar repository data, the placement order of the calculated values of the digests of the similar repository data correlative to an order in which the input digest values were individually calculated such that the digests of the similar repository data are each individually stored in the global digests cache based on a calculation time and order of when each of the input digests were first calculated when in un-deduplicated form, thereby storing the digests of the similar repository data in a linear and sequential form independent of a deduplicated form by which data the digests describe is stored, wherein the global digest cache comprises a pool of a plurality of sequential arrays of digest entries of the digests and a hash table for pointing to contents within the plurality of sequential arrays.

10. The system of claim 9, wherein the global digests cache contains a plurality of digests previously loaded by a plurality of deduplication processes.

11. The system of claim 10, wherein the at least one processor device reuses at least one of a plurality of sequential arrays of digest entries of the global digests cache according to a least recently used (LRU) policy.

12. The system of claim 11, wherein the at least one processor device applies the LRU digest policy on the plurality of sequential arrays of digest entries of the plurality of digests.

13. The system of claim 12, wherein the at least one processor device searches for the input digests by considering both the plurality of digests previously loaded by the plurality of deduplication processes and the digests of the similar repository data currently loaded into the global digests cache within a time window reflected by the global digests cache, wherein the global digests cache reflects a window of time backwards from a current time.

14. The system of claim 9, wherein the at least one processor device performs one of:
calculating similarity values for each of the input data chunks,
searching for matching similarity values in a search structure containing the similarity values, and
matching the digest values of the input data with the repository digest values of the repository digests loaded into the memory of the global digests cache for locating the data matches.

15. The system of claim 9, wherein the at least one processor device matches the input digests of the input data and the repository digests contained in the global digests cache for finding data matches if a search for the similar repository data in the repository fails to find the similar repository data.

16. The system of claim 9, wherein the at least one processor device prefers to match the input digests of the input data and the repository digests contained the global digests cache for repository data identified as similar to the input data if a search for the similar repository data in the repository finds the similar repository data.

17. A computer program product for utilizing a global digests cache in a deduplication process for improving efficiency for internally reordered and high change rate workloads in a data deduplication system using a processor device in a computing environment, the computer program product comprising a non-transitory computer-readable storage medium having computer-readable program code portions stored therein, the computer-readable program code portions comprising:
an executable portion that partitions input data into input data chunks;
an executable portion that calculates input digest values for each of the input data chunks;
an executable portion that finds positions of similar repository data in a repository of data for each of the input data chunks;
an executable portion that matches input digests of the input data chunks and the repository digests contained in the global digests cache for locating data matches; and
an executable portion that uses the positions of the similar repository data to locate and linearly load into the global digests cache, digests and digest block boundaries of the similar repository data in a sequence corresponding to a placement order of calculated values of the digests of the similar repository data, the placement order of the calculated values of the digests of the similar repository data correlative to an order in which the input digest values were individually calculated such that the digests of the similar repository data are each individually stored in the global digests cache based on a calculation time and order of when each of the input digests were first calculated when in un-deduplicated form, thereby storing the digests of the similar repository data in a linear and sequential form independent of a deduplicated form by which data the digests describe is stored, wherein the global digest cache comprises a pool of a plurality of sequential arrays of digest entries of the digests and a hash table for pointing to contents within the plurality of sequential arrays.

18. The computer program product of claim 17, wherein the global digests cache contains a plurality of digests previously loaded by a plurality of deduplication processes.

19. The computer program product of claim 18, further including an executable portion that reuses at least one of a plurality of sequential arrays of digest entries of the global digests cache according to a least recently used (LRU) policy.

20. The computer program product of claim 19, further including an executable portion that applies the LRU digest policy on the plurality of sequential arrays of digest entries of the plurality of digests.

21. The computer program product of claim 20, further including an executable portion that searches for the input digests by considering both the plurality of digests previously loaded by the plurality of deduplication processes and the digests of the similar repository data currently loaded into the global digests cache within a time window reflected by the global digests cache, wherein the global digests cache reflects a window of time backwards from a current time.

22. The computer program product of claim 17, further including an executable portion that performs one of:
calculating similarity values for each of the input data chunks,
searching for matching similarity values in a search structure containing the similarity values, and
matching the digest values of the input data with the repository digest values of the repository digests loaded into the memory of the global digests cache for locating the data matches.

23. The computer program product of claim 17, further including an executable portion that matches the input digests of the input data and the repository digests contained in the global digests cache for finding data matches if a search for the similar repository data in the repository fails to find the similar repository data.

24. The computer program product of claim 17, further including an executable portion that prefers to match the input digests of the input data and the repository digests contained the global digests cache for repository data identified as similar to the input data if a search for the similar repository data in the repository finds the similar repository data.

* * * * *